United States Patent
Willems et al.

(10) Patent No.: US 7,025,319 B2
(45) Date of Patent: Apr. 11, 2006

(54) LONGITUDINAL ADJUSTER FOR A VEHICLE SEAT

(75) Inventors: Boris Willems, Schmelz (DE); Hermann Jost, Kaiserslautern (DE); Jürgen Krebs, Rockenhausen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/941,655

(22) Filed: Sep. 15, 2004

(65) Prior Publication Data

US 2005/0051694 A1 Mar. 10, 2005

Related U.S. Application Data

(63) Continuation of application No. PCT/EP2003/007152, filed on Jul. 4, 2003.

(30) Foreign Application Priority Data

Jul. 23, 2002 (DE) .............. 202 11 090 U

(51) Int. Cl.
*F16M 13/00* (2006.01)

(52) U.S. Cl. ............... 248/430; 296/65.18; 297/341

(58) Field of Classification Search ............ 248/430, 248/424, 429; 384/46, 47; 297/341; 296/65.18, 296/65.05
See application file for complete search history.

(56) References Cited

U.S. PATENT DOCUMENTS

| | | | | |
|---|---|---|---|---|
| 3,889,913 A | * | 6/1975 | Adams | 248/430 |
| 3,960,413 A | * | 6/1976 | Abbuhl et al. | 384/47 |
| 4,602,758 A | | 7/1986 | Mann et al. | |
| 4,673,217 A | * | 6/1987 | Nishiyama et al. | 297/473 |
| 5,350,148 A | * | 9/1994 | Yamamura | 248/430 |
| 5,676,341 A | * | 10/1997 | Tarusawa et al. | 248/430 |
| 5,741,000 A | | 4/1998 | Goodbred | |
| 5,842,383 A | * | 12/1998 | Yamada et al. | 74/528 |
| 6,557,809 B1 | * | 5/2003 | Downey | 248/430 |
| 6,688,574 B1 | * | 2/2004 | Okazaki et al. | 248/424 |

FOREIGN PATENT DOCUMENTS

| | | | |
|---|---|---|---|
| DE | 33 02 467 A1 | | 7/1984 |
| DE | 33 23 431 A1 | | 1/1985 |
| DE | 41 03 043 A1 | | 8/1992 |
| DE | 195 49 378 A1 | | 2/1997 |
| DE | 198 12 045 A1 | | 9/1999 |
| FR | 1 246 052 | | 11/1960 |
| JP | 2002-160554 | * | 6/2002 |
| WO | WO 02/06078 A1 | | 1/2002 |

* cited by examiner

*Primary Examiner*—Ramon O Ramirez
(74) *Attorney, Agent, or Firm*—Womble Carlyle Sandridge & Rice, PLLC

(57) ABSTRACT

In a longitudinal adjuster for a vehicle seat, in particular for an automobile seat, having a first seat rail, a second seat rail that can be made to slide relatively to the first seat rail, rollers (9) arranged between the two seat rails, and at least one ball retainer (11) for retaining the rollers (9), the rollers (9) are arranged at irregular intervals (a,b) in the rails' longitudinal direction.

20 Claims, 2 Drawing Sheets

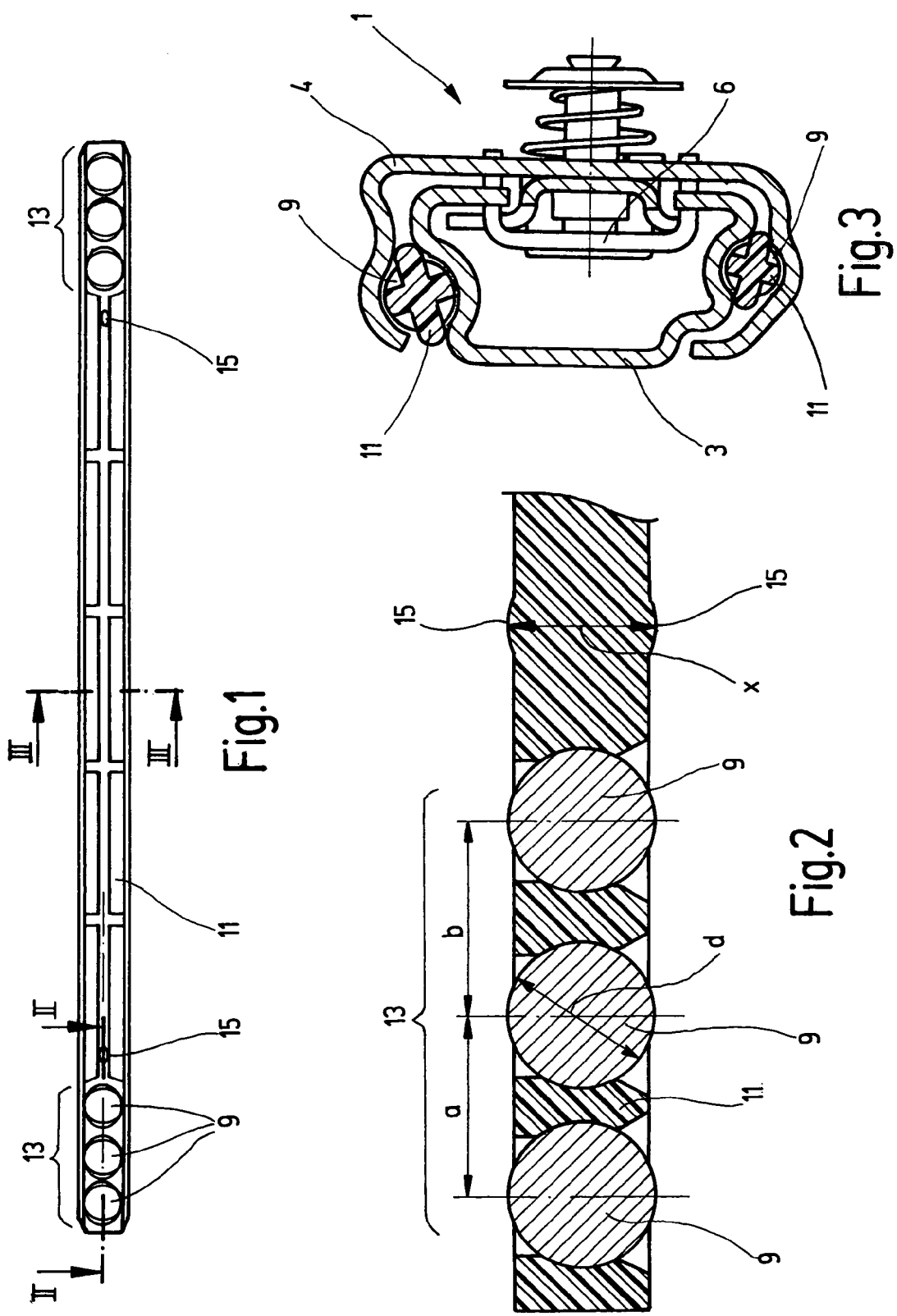

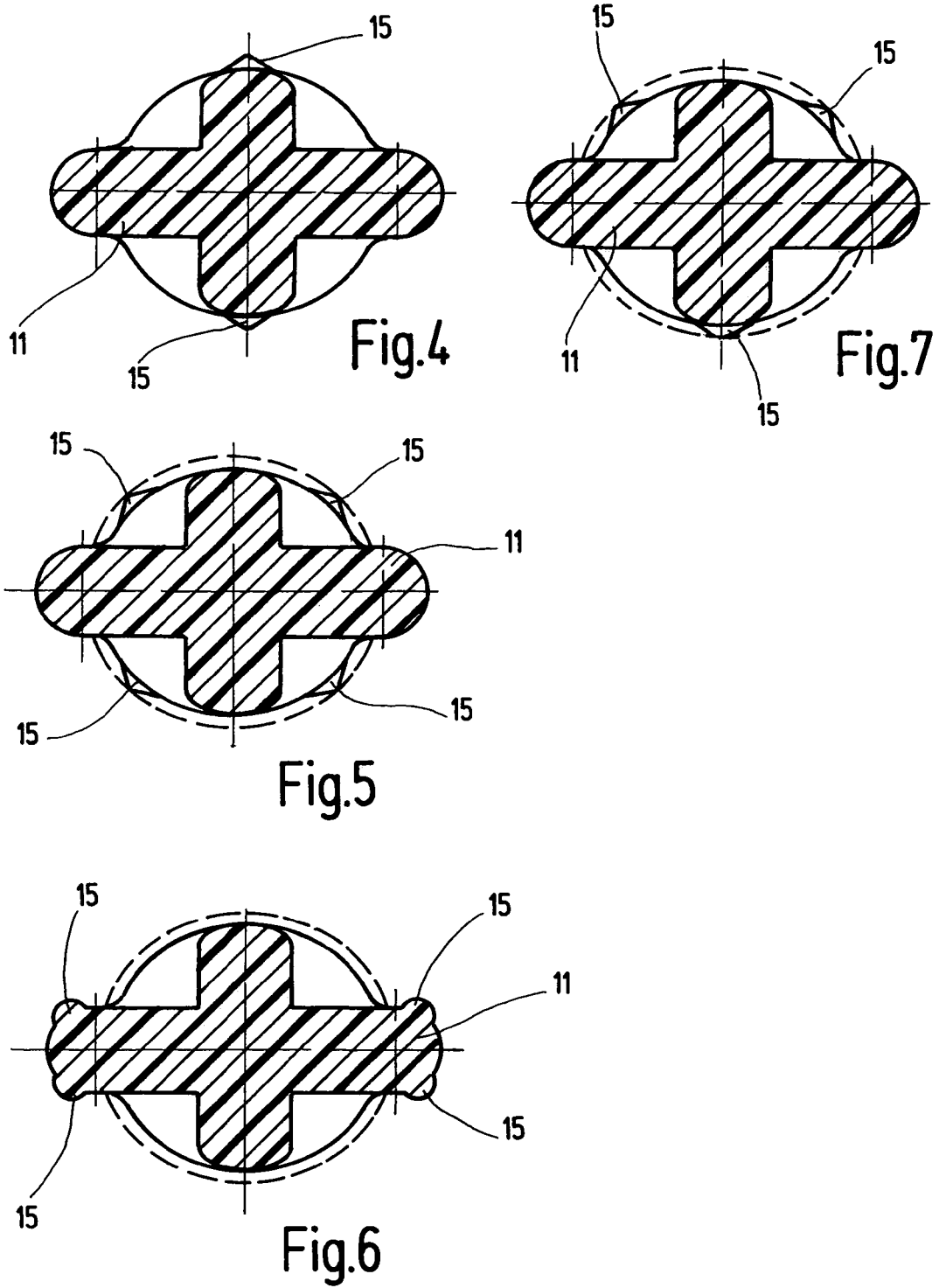

LONGITUDINAL ADJUSTER FOR A VEHICLE SEAT

CROSS-REFERENCE TO RELATED APPLICATION

This is a continuation of PCT/EP2003/007152, which was filed Jul. 4, 2003, designates the U.S., and is incorporated herein by reference.

BACKGROUND OF THE INVENTION

The present invention concerns a longitudinal adjuster for a vehicle seat, in particular for an automobile seat, having a first seat rail, a second seat rail, rollers arranged between the two seat rails so that the second seat rail can slide relative to the first seat rail, and at least one retainer for retaining the rollers.

In a known longitudinal adjuster of the type described in the immediately preceding paragraph, there is a risk that under load, possibly even during normal use, brinelling will occur, i.e. the rollers will produce indentations in the material of the seat rails. When passing over these indentations, a noisy disturbance may occur.

BRIEF SUMMARY OF SOME ASPECTS OF THE INVENTION

The invention is based on the object of improving a longitudinal adjuster of the type mentioned above. In accordance with one aspect of the present invention, a longitudinal adjuster for a vehicle seat, in particular for an automobile seat, has a first seat rail, a second seat rail, rollers arranged between the two seat rails so that the second seat rail can slide relative to the first seat rail, and at least one retainer for retaining the rollers, wherein the rollers are arranged at irregular intervals in the rails' longitudinal direction.

Since the rollers are arranged at irregular intervals in the rails' longitudinal direction, the subjective perception of the noise produced by the rollers is reduced even when the seat rails are brinelled. The irregular intervals prevent the amplification of vibrational impulses in the rollers. The distinct rattling produced when several rollers are passing over the indentations at the same time is significantly reduced. At the most, one roller is producing a noise. Easy sliding is thus improved.

The desired translation asymmetry is achieved when the rollers are arranged in ball packages in which the distances between two neighboring rollers in one ball package vary from one another and, if there are two ball packages, the distances within the ball packages are preferably arranged mirror-symmetrically with respect to the center of the ball retainer. The distances within the ball packages are provided on the smallest technically possible scale, whereas the number of rollers, preferably three or more, is as large as possible in order to reduce point loads on the running surface.

The seat rail running surfaces for the rollers are preferably made from the same material as the rollers, and/or the curvature radius of the running surfaces is greater than the radius of the rollers, preferably slightly greater, allowing the rollers to roll with minimum surface pressure, to reduce the risk of brinelling.

Because the ball retainer has at least one tongue transversally to the rails' longitudinal direction, the ball retainer's movement transversally to the rails' longitudinal direction, i.e. vacillation, rotation or swaying in the event of a change in direction, can be reduced, particularly if the tongue bears against one running surface of a seat rail.

The tongues are preferably oriented with their bodies in the rails' longitudinal direction, so that the pushing force does not measurably increase through contact of the tongues with the running surface. A preferred arc shape of the tongue's contact surface on the running surface has the advantage of making assembly easier and minimizing friction. Preferably, there are pairs of tongues diametrically opposite to one another having an effective height exceeding the diameter of the rollers, thus producing initial tension. For this purpose, it is also preferable to have a ball retainer made of plastic. The tongues may be bonded to existing longitudinal ribs, preferably to the back of the ribs.

BRIEF DESCRIPTION OF THE DRAWINGS

The invention is explained in greater detail below with reference to an exemplary embodiment illustrated in the drawings, in which:

FIG. 1 is a top view of a ball retainer of the exemplary embodiment,

FIG. 2 is a longitudinal section along the linne II—II in FIG. 1,

FIG. 3 is a cross-section through the exemplary embodiment along the line III—III in FIG. 1, FIG. 4 is a partial view of FIG. 3, FIG. 5 is a first modification of FIG. 4, FIG. 6 is a second modification of FIG. 4, and FIG. 7 is a third modification of FIG. 4.

DETAILED DESCRIPTION OF THE INVENTION

A longitudinal adjuster 1 for a longitudinally adjustable vehicle seat, in particular for a vehicle seat, has on each side of the vehicle seat a first seat rail 3, which is mounted to the vehicle structure and functions as a guiding rail, and a second seat rail 4, which is mounted to the seat structure and functions as a running rail. Each second seat rail 4 is guided to slide in a longitudinal direction on the first corresponding seat rail 3 and can be reversibly locked by means of a locking device 6 in different longitudinal seat positions of the vehicle seat.

In order to have a minimum friction to overcome when sliding the second seat rail 4 along the first seat rail 3, several rollers, herein balls 9, are installed between the two seat rails 3 and 4 which are enclosed in packages by ball retainers 11. The ball retainers 11, with the bearing balls 9, are aligned in the rails' longitudinal direction and are arranged between pairs of running surfaces. One of the running surfaces is formed on the first seat rail 3 and the other running surface is formed on the second seat rail 4.

In the exemplary embodiment, according to which the two seat rails 3 and 4 are laterally attached, there is a ball retainer 11 with larger bearing balls 9, and a ball retainer 11 with smaller bearing balls 9. Each ball retainer 11 is made of plastic in the shape of a rod having in each terminal area one ball package 13, each containing three bearing balls 9 on which the load is evenly distributed.

So-called brinelling, i.e. the indentation of the running surface caused by the bearing balls 9 under load in a set longitudinal position of the seat, causes noise when the seat is longitudinally adjusted, a kind of rattling caused when all the bearing balls 9 pass over the indented areas in the running surface at the same time. To avoid or reduce brinelling, a maximum number of bearing balls 9 (in this case three per ball package 13), a maximum diameter "d" of the bearing balls 9 and a maximum distance between the ball packages 13 are chosen under any given condition, the running surface and the bearing balls 9 are made of the same material (e.g., steel), i.e. have the same modulus of elasticity and are only tempered differently, and the curvature radius of the running surface transverse to the rails' longitudinal direction is chosen to be maximally 1 mm larger than the radius of the bearing balls 9. With this latter measure, the surface pressure when the bearing balls 9 are rolling is reduced to a minimum.

In order to reduce the noise in the case of indentations that may occur in spite of this, the distances between the bearing balls 9 in the ball retainer 11 are irregular, i.e. the distances vary between the three neighboring bearing balls 9 within the same ball package 13. The distance between the bearing ball 9 arranged at the outer edge and the middle bearing ball 9 is designated by "a" in FIG. 2, and it is less than the distance between the middle bearing ball 9 and the third bearing ball 9 of the ball package 13, which is designated by "b" in FIG. 2. This arrangement is mirrored at the other end of the ball retainer 13, i.e. the distances a and b are identical with respect to the middle of the ball retainer 11. With this arrangement, at the most one bearing ball 9 will produce noise when passing over the indentations, unless the seat's longitudinal position set during brinelling is passed over. In addition, no uniform frequency is produced which would stimulate further noise. In a modified version, the distance "a" is greater than the distance "b".

The bearing balls 9 bear against the running surfaces under prestress. This way, the ball retainers 11 can generally move freely. Vibration of the vehicle and uneven rolling of the bearing balls 9 may produce irregular rattling or lateral or rotary vibrations of the ball retainers 11, causing noises.

For reducing or, ideally, eliminating this unwanted movement of the ball retainers 11, two tongues 15 are formed on the ball retainer 11 in the immediate vicinity of the ball packages 13, arranged in pairs in diametrically opposite positions. The tongues 15 extend from two longitudinal ribs of the ball retainer 11 transversally to the rails' longitudinal direction, preferably from the back of these longitudinal ribs. The tongues 15 have an effective height designated by "x" in FIG. 2 (diameter distance between the two areas on the two tongues 15 that protrude farthest transversally to the rails' longitudinal direction) which is greater than the diameter "d" of the neighboring bearing balls 9. The tongues 15, therefore, bear against the running surfaces, slowing down the unwanted movements of the ball retainers 11. The material of the tongues 15 is oriented in the rails' longitudinal direction, so that the pushing force is slightly, if at all, increased by the tongues. In the areas where there is contact with the running surfaces, the tongues 15 are arc-shaped to facilitate assembly and minimize friction.

In a first modification according to FIG. 5, there are groups of four tongues 15 which are provided on transversal ribs of the ball retainer 11, each of them between the longitudinal ribs. In a second modification according to FIG. 6, there are also four tongues arranged in pairs on the two longitudinal ribs of the ball retainer that are located in the gap between the running surfaces and the seat rails 3 and 4. In a third modification according to FIG. 7, being a combination of the exemplary embodiment and the first modification, there are groups of three tongues 15 on the transversal ribs, each tongue 15 at the junction point of a transversal and a longitudinal rib. The effective height x, in the present case the diameter of the circumscribing perimeter, is greater than the respective diameter "d" of the bearing balls 9. Particularly in the second modification, the tongues 15 can be arranged in any chosen position in the longitudinal direction of the ball retainer 11.

That which is claimed:

1. A longitudinal adjuster for a vehicle seat, with the longitudinal adjuster comprising:

a first seat rail extending in a longitudinal direction;

a second seat rail extending in the longitudinal direction;

a plurality of rollers positioned between the first seat rail and the second seat rail so that the second seat rail can slide relative to the first seat rail, with rollers of the plurality of rollers each having a diameter; and at least one retainer for retaining the plurality of rollers, wherein three neighboring rollers of the plurality of rollers are arranged at irregular intervals in the longitudinal direction, the retainer retains at least the three neighboring rollers in a first package, and a second package of rollers of the plurality of rollers is positioned between the first and second seat rails, the three neighboring rollers includes a first roller, a second roller and a third roller, the second roller is positioned between the first and third rollers, the first roller and the second roller are adjacent to one another and spaced apart from one another by a first distance in the longitudinal direction, the second roller and the third roller are adjacent to one another and spaced apart from one another by a second distance in the longitudinal direction, the second distance is different from the first distance, the first and second packages are adjacent to one another and spaced apart from one another by a third distance in the longitudinal direction, the third distance is larger than each of the first distance and the second distance, the first distance is larger than the diameter, the first distance is smaller than twice the diameter, the second distance is larger than the diameter, and the second distance is smaller than twice the diameter.

2. A longitudinal adjuster according to claim 1, wherein the retainer retains at least three rollers of the plurality of rollers in the second package.

3. A longitudinal adjuster according to claim 1, wherein:

the second roller is positioned between the first roller and the second package, the third roller is positioned between the second roller and the second package, and the second distance is less than the third distance.

4. A longitudinal adjuster according to claim 3, wherein:

the retainer includes opposite first and second ends, the first package is proximate the first end of the retainer, the second package is proximate the second end of the retainer, the second package includes at least a fourth roller, a fifth roller and a sixth roller of the plurality of rollers, the fifth roller is positioned between the fourth roller and the sixth roller, the fourth roller and the fifth roller are adjacent to one another and spaced apart from one another by a fourth distance in the longitudinal direction, with the fourth distance being less than the third distance, the fifth roller and the sixth roller are adjacent to one another and spaced apart from one another by a fifth distance in the longitudinal direction, with the fifth distance being less than the third distance, the fifth roller is positioned between the sixth roller and the first package, the fourth roller is positioned between the fifth roller and the first package, and the fifth distance is less than the fourth distance.

5. A longitudinal adjuster according to claim 1, wherein the longitudinal adjuster is in combination with the vehicle seat so that the vehicle seat is longitudinally adjustable.

6. A longitudinal adjuster according to claim 1, wherein the third distance is multiple times larger than each of the first distance and the second distance.

7. A longitudinal adjuster according to claim 1, wherein:
each of the first seat rail and the second seat rail includes a running surface upon which the rollers run,
each of the running surfaces has a curvature which extends transverse to the longitudinal direction and has a radius that is larger than each of the rollers' radiuses, and
the running surfaces and the first roller, the second roller and the third roller are all constructed of the same material.

8. A longitudinal adjuster according to claim 1, wherein the first distance is less than the second distance.

9. A longitudinal adjuster for a vehicle seat, with the longitudinal adjuster comprising:
a first seat rail extending in a longitudinal direction;
a second seat rail extending in the longitudinal direction;
a plurality of rollers positioned between the first seat rail and the second seat rail so that the second seat rail can slide relative to the first seat rail; and
at least one retainer for retaining the plurality of rollers,
wherein three neighboring rollers of the plurality of rollers are arranged at irregular intervals in the longitudinal direction, and
wherein the retainer includes at least one tongue which extends both in the longitudinal direction and transverse to the longitudinal direction, with the tongue having an arc-shaped bearing surface which bears against a running surface selected from a group consisting of the running surface of the first seat rail and the running surface of the second seat rail.

10. A longitudinal adjuster according to claim 9, wherein:
each of the running surface of the first seat rail and the running surface of the second seat rail has a curvature which extends transverse to the longitudinal direction and has a radius that is larger than each of the rollers' radiuses, and
the running surfaces and the rollers are constructed of the same material.

11. A longitudinal adjuster according to claim 9, wherein:
the tongue is a first tongue which is bonded to a rib of the retainer at a position which is in close proximity to a roller of the rollers,
the first tongue is positioned in a gap defined between the first seat rail and the second seat rail,
a second tongue of the retainer is diametrically opposite from the first tongue and includes a bearing surface which bears against the running surface of the first seat rail or the running surface of the second seat rail, and
the bearing surface of the first tongue is spaced apart from the bearing surface of the second tongue by a distance which is greater than the rollers' diameters.

12. A longitudinal adjuster for a vehicle seat, with the longitudinal adjuster comprising:
a first seat rail extending in a longitudinal direction;
a second seat rail extending in the longitudinal direction;
a plurality of rollers positioned between the first seat rail and the second seat rail so that the second seat rail can slide relative to the first seat rail; and
at least one retainer for retaining the plurality of rollers, wherein
three neighboring rollers of the plurality of rollers are arranged at irregular intervals in the longitudinal direction,
the retainer retains at least the three neighboring rollers in a first package, and a second package of rollers of the plurality of rollers is positioned between the first and second seat rails,
the three neighboring rollers includes a first roller, a second roller and a third roller,
the second roller is positioned between the first and third rollers,
the first roller and the second roller are adjacent to one another and spaced apart from one another by a first distance in the longitudinal direction,
the second roller and the third roller are adjacent to one another and spaced apart from one another by a second distance in the longitudinal direction,
the second distance is different from the first distance,
the first and second packages are adjacent to one another and spaced apart from one another by a third distance in the longitudinal direction,
the third distance is larger than each of the first distance and the second distance, and
the retainer includes at least one tongue which extends both in the longitudinal direction and transverse to the longitudinal direction, with the tongue having an arc-shaped bearing surface which bears against a running surface selected from a group consisting of the running surface of the first seat rail and the running surface of the second seat rail.

13. A longitudinal adjuster according to claim 12, wherein:
the tongue is a first tongue which is bonded to a rib of the retainer at a position which is in close proximity to a roller of the rollers,
the first tongue is positioned in a gap defined between the first seat rail and the second seat rail,
a second tongue of the retainer is diametrically opposite from the first tongue and includes a bearing surface which bears against the running surface of the first seat rail or the running surface of the second seat rail, and
the bearing surface of the first tongue is spaced apart from the bearing surface of the second tongue by a distance which is greater than the rollers' diameters.

14. A longitudinal adjuster for a vehicle seat, with the longitudinal adjuster comprising:
a first seat rail extending in a longitudinal direction;
a second seat rail extending in the longitudinal direction; and
at least one retainer retaining a plurality of rollers between the first seat rail and the second seat rail so that the second seat rail can slide relative to the first seat rail, wherein the retainer includes at least one tongue that extends transverse to the longitudinal direction and includes a bearing surface which bears against a seat rail selected from a group consisting of the first seat rail and the second seat rail, and wherein the rollers are arranged at irregular intervals in the longitudinal direction.

15. A longitudinal adjuster according to claim 14, wherein the retainer retains at least the three neighboring rollers in a first package, and a second package of rollers of the plurality of rollers is positioned between the first and second seat rails.

16. A longitudinal adjuster according to claim 15, wherein:
the three neighboring rollers includes a first roller, a second roller and a third roller,
the second roller is positioned between the first and third rollers,
the first roller and the second roller are adjacent to one another and spaced apart from one another by a first distance in the longitudinal direction,
the second roller and the third roller are adjacent to one another and spaced apart from one another by a second distance in the longitudinal direction,
the second distance is different from the first distance,
the first and second packages are adjacent to one another and spaced apart from one another by a third distance in the longitudinal direction, and
the third distance is larger than each of the first distance and the second distance.

17. A longitudinal adjuster according to claim 14, wherein:
each of the first seat rail and the second seat rail includes a running surface upon which the rollers run, and
the running surfaces and the rollers are constructed of the same material.

18. A longitudinal adjuster according to claim 14, wherein the tongue has an arc-shaped bearing surface which bears against the seat rail selected from the group consisting of the first seat rail and the second seat rail.

19. A longitudinal adjuster according to claim 14, wherein:
each of the first seat rail and the second seat rail includes a running surface upon which the rollers run, and
the bearing surface is arc-shaped and bears against a running surface selected from a group consisting of the running surface of the first seat rail and the running surface of the second seat rail.

20. A longitudinal adjuster according to claim 14, wherein:
the tongue is a first tongue which is bonded to a rib of the retainer at a position which is in close proximity to a roller of the rollers,
the tongue is positioned in a gap defined between the first seat rail and the second seat rail,
a second tongue of the retainer is diametrically opposite from the first tongue and includes a bearing surface which bears against the running surface of the first seat rail or the running surface of the second seat rail, and
the bearing surface of the first tongue is spaced apart from the bearing surface of the second tongue by a distance which is greater than the rollers' diameters.

* * * * *